(12) United States Patent
Chee et al.

(10) Patent No.: US 11,501,731 B2
(45) Date of Patent: Nov. 15, 2022

(54) METHOD AND DEVICE FOR ASSIGNING VIDEO STREAMS TO WATCHER DEVICES

(71) Applicant: MOTOROLA SOLUTIONS, INC., Chicago, IL (US)

(72) Inventors: Chong Hin Chee, Gelugor (MY); Chong Keat Chua, Ayer Itam (MY); Bijun Leong, Ayer Itam (MY); Wei Lun Chan, Simpang Ampat (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 230 days.

(21) Appl. No.: 16/842,812

(22) Filed: Apr. 8, 2020

(65) Prior Publication Data

US 2021/0319765 A1    Oct. 14, 2021

(51) Int. Cl.
*H04N 21/218*    (2011.01)
*H04N 21/258*    (2011.01)
(Continued)

(52) U.S. Cl.
CPC .............. *G09G 5/005* (2013.01); *G06V 20/52* (2022.01); *H04N 21/21805* (2013.01); *H04N 21/25808* (2013.01); *H04N 21/6332* (2013.01)

(58) Field of Classification Search
CPC ....... H04N 21/21805; H04N 21/25808; H04N 21/4518; H04N 21/4223; G08B 13/19682; G08B 13/19684; G06V 20/52
See application file for complete search history.

(56) References Cited

U.S. PATENT DOCUMENTS 8,166,507 B2    4/2012  McDowell et al.
9,591,336 B2 *  3/2017  Cronin ............... H04N 21/2187
(Continued)

FOREIGN PATENT DOCUMENTS

WO    2019182462 A1    9/2019
WO    2020009591 A1    1/2020

OTHER PUBLICATIONS

The International Search Report and the Written Opinion, patent application No. PCT/US2021/024293 filed: Mar. 26, 2021, dated May 19, 2021, all pages.
(Continued)

*Primary Examiner* — Pinkal R Chokshi
(74) *Attorney, Agent, or Firm* — Raguraman Kumaresan

(57) ABSTRACT

A process for operating an electronic computing device to assign video streams to watcher devices. The electronic computing device detects objects of interest within a field-of-view of a camera as a function of incident context information. The electronic computing device obtains video display characteristics associated with watcher devices and further determines, based on respective positions of the objects of interest within the field-of-view, a plurality of sub-regions each enclosing at least one of the detected objects of interest and having one or more video attributes. The electronic computing device then assigns, based on the video display characteristics associated with the watcher devices and the video attributes of the sub-regions, each of the sub-regions to a respectively selected one of the watcher devices. The video streams respectively captured corresponding to each of the assigned sub-regions of interest are then transmitted to the respectively selected one of the watcher devices.

20 Claims, 4 Drawing Sheets

(51) Int. Cl.
*G06V 20/52* (2022.01)
*G09G 5/00* (2006.01)
*H04N 21/6332* (2011.01)

(56) References Cited

U.S. PATENT DOCUMENTS

| | | | |
|---|---|---|---|
| 9,684,435 B2* | 6/2017 | Carr | G11B 27/34 |
| 9,871,998 B1* | 1/2018 | Curlander | G06V 20/54 |
| 10,728,438 B1* | 7/2020 | Smith | H04L 65/80 |
| 2005/0091098 A1 | 4/2005 | Brodersen et al. | |
| 2007/0035627 A1* | 2/2007 | Cleary | H04N 21/4223 |
| | | | 348/E7.086 |
| 2010/0002082 A1* | 1/2010 | Buehler | G08B 13/19693 |
| | | | 348/E7.085 |
| 2011/0242317 A1* | 10/2011 | Wengrovitz | H04N 21/26258 |
| | | | 348/143 |
| 2013/0002880 A1* | 1/2013 | Levinson | G08B 25/016 |
| | | | 348/E7.085 |
| 2014/0333776 A1* | 11/2014 | Dedeoglu | H04N 21/44008 |
| | | | 348/159 |
| 2017/0086192 A1* | 3/2017 | Bohlander | A61B 5/024 |
| 2017/0142372 A1 | 5/2017 | Cho | |
| 2018/0050800 A1* | 2/2018 | Boykin | G10L 25/51 |
| 2018/0062846 A1* | 3/2018 | Li | G06F 21/32 |
| 2018/0103291 A1* | 4/2018 | Gefen | H04N 21/44016 |
| 2018/0330169 A1* | 11/2018 | van Hoof | G08B 13/19613 |
| 2020/0007921 A1 | 1/2020 | Ojala | |
| 2020/0169764 A1* | 5/2020 | Aflaki Beni | H04N 7/181 |
| 2021/0297929 A1* | 9/2021 | Frusina | H04L 45/42 |

OTHER PUBLICATIONS

Makar, Mina & Mavlankar, Aditya & Agrawal, Piyush & Girod, Bernd. (2010). Real-time video streaming with interactive region-of-interest. 4437-4440. 10.1109/ICIP.2010.5653982.

* cited by examiner

METHOD AND DEVICE FOR ASSIGNING VIDEO STREAMS TO WATCHER DEVICES

BACKGROUND

Public safety agencies often rely on watchers to manually screen video captured from public locations for detecting suspicious activities. As mobile devices are increasingly used for video consumption, public safety organizations have also begun to stream video to mobile devices of watchers such as first responders to allow them to screen an incident area for suspicious activities. While mobile devices allow portability, small screen sizes and other inherent limitations associated with mobile devices can pose difficulties to watchers as video screening demands substantial attention from watchers. In addition, it can also be difficult for a watcher to simultaneously screen multiple points of interest on a video feed covering a large incident area.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
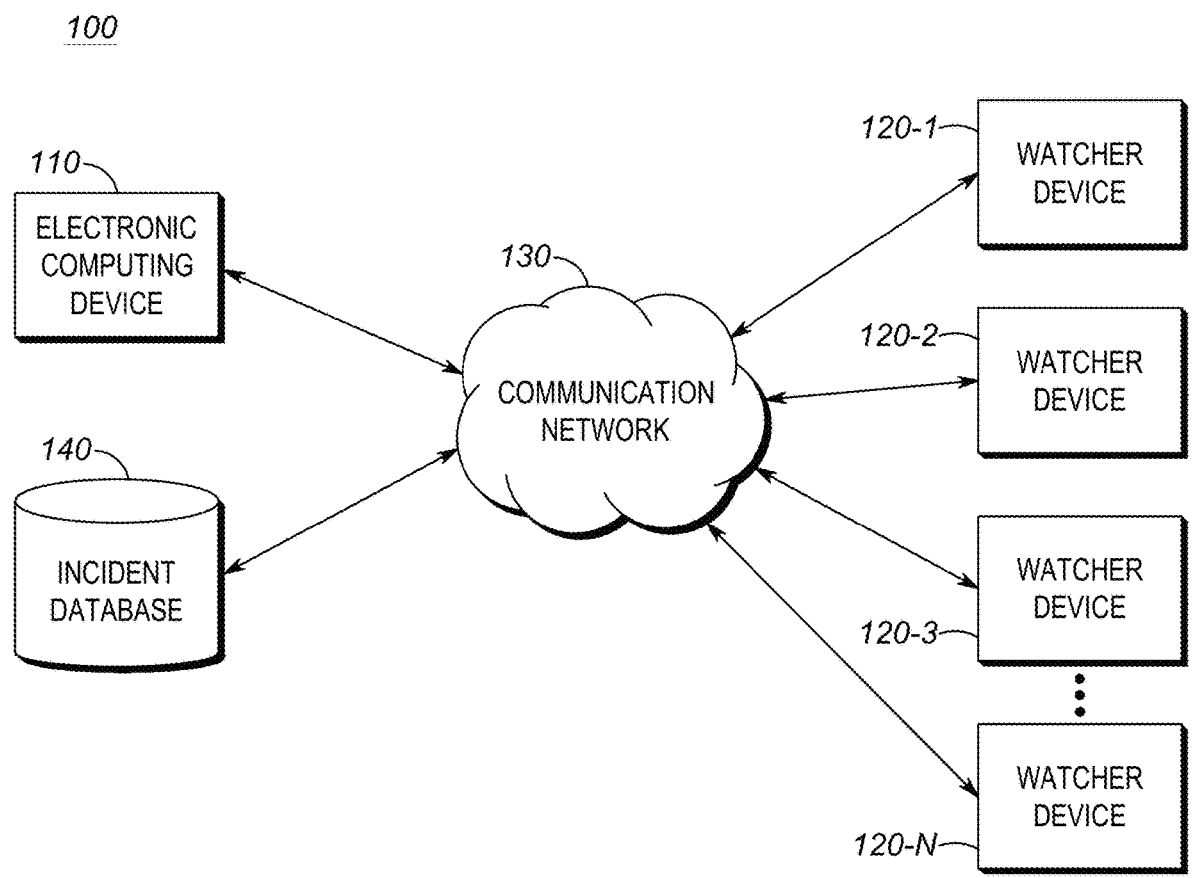
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, it can be difficult for a watcher to simultaneously watch multiple points of interest from a video covering a large incident area. In such cases, each of these points of interest can be assigned to a different watcher for screening purposes. While it addresses one problem associated with screening multiple points of interest, watcher devices (e.g., a mobile device) operated by a watcher to screen a video stream have certain device limitations that can have effect on the display characteristics of the video stream. For example, watcher devices may have limitations in terms of screen size, resolution, network bandwidth, aspect ratio, operating mode etc. It may be humanly impossible to assign multiple points of interest of a large incident area to multiple watcher devices while also taking into consideration the unique attributes of each of these points of interest and the limitations inherent in the watcher devices. Disclosed is an improved method and device of assigning video streams corresponding to multiple points of interest to multiple watcher devices.

One embodiment provides a method of assigning video streams to watcher devices. The method includes: obtaining, at an electronic computing device, context information associated with an incident; detecting, at the electronic computing device, as a function of the context information, a plurality of objects of interest within a field-of-view of a camera; obtaining, at the electronic computing device, one or more video display characteristics associated with a plurality of watcher devices; determining, at the electronic computing device, based on respective positions of the objects of interest within the field-of-view, a plurality of sub-regions of the field-of-view, each of the sub-regions enclosing at least one of the detected objects of interest and has one or more video attributes; assigning, at the electronic computing device, based on the one or more video display characteristics associated with the watcher devices and the one or more video attributes of the sub-regions, each of the sub-regions to a respectively selected one of the watcher devices; and causing, at the electronic computing device, transmission of video streams respectively captured corresponding to each of the assigned sub-regions of interest to the respectively selected one of the watcher devices.

Another embodiment provides an electronic computing device including a transceiver and an electronic processor communicatively coupled to the transceiver. The electronic processor is configured to: obtain context information associated with an incident; detect, as a function of the context information, a plurality of objects of interest within a field-of-view of a camera: obtain one or more video display characteristics associated with a plurality of watcher devices; determine, based on respective positions of the objects of interest within the field-of-view, a plurality of sub-regions of the field-of-view, each of the sub-regions enclosing at least one of the detected objects of interest and has one or more video attributes; assign, based on the one or more video display characteristics associated with the watcher devices and the one or more video attributes of the sub-regions, each of the sub-regions to a respectively selected one of the watcher devices; and cause transmission of video streams respectively captured corresponding to each of the assigned sub-regions of interest to the respectively selected one of the watcher devices.

Each of the above-mentioned embodiments will be discussed in more detail below, starting with example system and device architectures of the system in which the embodiments may be practiced, followed by an illustration of processing blocks for achieving an improved technical method, device, and system for assigning video streams to watcher devices. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a communication system 100 is shown including an electronic computing device 110 communicatively coupled to a plurality of watcher devices 120-1 through 120-n via a communication network 130. The plurality of watcher devices 120-1, 120-2 . . . 120-n can be interchangeably referred to, collectively, as watcher devices 120, and generically as a watcher device 120. Each watcher device 120 may be operated by a respective watcher (e.g., a public safety personnel) who may carry or wear the respective watcher device 120. As used herein, the term "watcher" refers to a human user who can perform one or more visual functions (referred herein as watching, screening, monitoring, surveilling, etc.,) with respect to a video stream displayed on a watcher device 120 for the purposes of detecting anomalous objects, events, or persons in relation to an assigned incident. The term "watcher" may also refer to an autonomous machine that is configured to perform real-time video analytics on a video stream displayed on a watcher device 120. In accordance with embodiments, each watcher device 120 includes an electronic display (not shown) that is configured to display a respective video stream assigned by the electronic computing device 110. The watcher devices 120 may take the form of a mobile phone or a portable two-way radio carried by public safety personnel, a computer tablet, a laptop, a vehicular display, a smart wearable, for example, a smart glass or smart watch, and the like.

The electronic computing device 110 may take the form of a fixed or a mobile computing device that is integrated or otherwise communicatively coupled to one or more cameras (not shown) to capture a video stream in its field-of-view corresponding to a geographic region to be monitored by multiple watchers. In accordance with some embodiments, the electronic computing device 110 is automatically configured to assign multiple video streams captured from within the field-of-view of the camera corresponding to the geographic region to multiple watcher devices 120 to enable each video stream to be independently and separately monitored by a different watcher via a respective watcher device 120. For example, a public safety commander assigned to respond to a particular incident may point a camera toward a geographical region (also referred to as an incident region) associated with the incident to be monitored and in response, the electronic computing device 110 automatically identifies multiple sub-regions within the field-of-view of the camera and further performs an assignment of each sub-region to a different watcher device 120 to enable a watcher associated with the watcher device 120 to monitor only a video stream corresponding to a particularly assigned sub-region. In particular, the sub-regions are identified by the electronic computing device 110 to ensure that each sub-region encloses at least one object of interest that is automatically detected from the field-of-view corresponding to the incident region. For example, the incident region may correspond to a region in a sports stadium on which multiple objects of interest are automatically identified for watching.

The communication system 100 includes an incident database 140 that stores context information associated with one or more incidents assigned to a public safety personnel operating the electronic computing device 110. The incident database 140 may be stored at a memory device (e.g., local memory or a cloud memory) that is accessible by the electronic computing device 110. The context information includes, for each incident, an incident identifier (e.g., a computer aided dispatch (CAD) identifier), type or severity of incident, incident location, public safety personnel assigned to respond to the incident, metadata related to persons (e.g., facial characteristics), objects (e.g., bags etc.,), or areas of interest (e.g., particular seats or areas in a stadium) (collectively referred to as objects of interest) that need to be monitored in relation to an incident, and user or device profile (e.g., talk group/video group identifier, video display characteristics of associated devices etc.,) corresponding to public safety personnel assigned to respond to the incident. In accordance with some embodiments, the electronic computing device 110 identifies watcher devices 120 for monitoring video streams corresponding to a particular incident region based on the user or device profile corresponding to the public safety personnel already assigned to the incident as obtained from the incident database 140. In accordance with some embodiments, the electronic computing device 110 automatically detects objects of interest (i.e., persons, objects, or areas to be monitored in relation to an incident) from a field-of-view of a camera using the incident context information obtained from the incident database 140. For example, if the incident context information requires monitoring of areas with particular objects of interest such as a person with a "red cap," then the electronic computing device 110 scans the field-of-view of the camera looking for a person with "a red cap." In this example, the electronic computing device 110 may be configured with an object classifier that evaluates an image captured corresponding to the field-of-view of the camera to determine if an instance of a person with a "red cap" as programmed in the object classifier is detected or not from the image. If an object of interest, i.e., the instance of the person with a "red cap" is detected, the electronic computing device 110 identifies the position (e.g., spatial coordinates) of the object of interest within the field-of-view of the camera corresponding to an incident region selected by public safety personnel assigned to the incident. Accordingly, in accordance with some embodiments, when the electronic computing device 110 identifies multiple such objects of interest based on the context information, the electronic computing device 110 makes a determination to employ multiple watcher devices 120 to screen multiple video streams that are captured corresponding to the incident region. In this case, the electronic computing device 110 automatically determines a plurality of sub-regions of the field-of-view based on the respective positions of the objects of interest within the field-of-view. The sub-regions (i.e., a space within the field-of-view that needs to be separately monitored) are determined to ensure that each sub-region encloses at least one of the identified objects of interest.

The electronic computing device 110 is configured to assign each of the sub-regions to a respectively selected one of the watcher devices 120 based on one or more video display characteristics associated with the watcher devices 120 and the one or more video attributes of the sub-regions. In accordance with some embodiments, the electronic computing device 110 uses video display characteristics including a size, shape, orientation, aspect ratio, resolution, rotatability, expandability, or foldability of an electronic display associated with a watcher device 120 to determine whether a particular watcher device 120 is suitable to be assigned to watch a particular one of the sub-regions. For example, a sub-region may have a video attribute requiring a wide display area that cannot be rotated. In this case, the sub-region (i.e., a video stream corresponding to the sub-region) is assigned to a watcher device 120 having a large wide display area. Similarly, a sub-region with a small display area may be assigned to a watcher device 120 having a small display area (e.g., watch display). In some embodiments, the electronic computing device 110 may rearrange or re-shape the sub-regions until the video attributes of the sub-regions each enclosing at least one of the objects of interest correlates with at least one of the watcher devices 120 available for screening video streams captured corresponding to the sub-regions. In this manner, the electronic computing device 110 ensures that each sub-region is separately monitored by a different watcher via a respectively assigned watcher device 120 that has the video display characteristics suitable for displaying the sub-region with its associated video attributes. In one embodiment, the electronic computing device 110 also uses characteristics such as network bandwidth and cognitive load associated with a watcher device 120 to determine if a particular watcher device 120 is suitable to be assigned to watch a particular one of the sub-regions. In another embodiment, the electronic computing device also uses characteristics of the object of interest such as a watch priority of the objects of interest and a number of objects of interest included in a particular sub-region as the basis for identifying a watcher device 120 for screening a sub-region enclosing such objects of interest.

In accordance with some embodiments, the electronic computing device 110 may affiliate to a video communication group of a public safety personnel assigned to the incident for the purpose of assigning video streams to watcher devices 120. For example, when the electronic computing device 110 makes a determination that a particular incident region includes multiple sub-regions each enclosing at least one object of interest to be monitored and further each of the multiple sub-regions are to be independently monitored by a separate watcher device 120, the electronic computing device 110 obtains the user or device profile of public safety personnel assigned to the incident and further assigns all or a subset of the public safety personnel assigned to the incident to the role of watchers. The electronic computing device 110 associates with or otherwise forms a video communication group with the watcher devices 120 associated with the public safety personnel assigned to the role of watchers. The electronic computing device 110 then establishes a video session for the watcher devices 120 included in the video communication group for simultaneously streaming video streams corresponding to different sub-regions of the selected incident region to watcher devices 120 to which the video streams are respectively assigned. In accordance with some embodiments, the electronic computing device 110 and watcher devices 120 operate using a Push-to-Video (PTV) technology. With PTV technology, the electronic computing device 110 has the option of sharing a live video capture including multiple video streams each corresponding to a sub-region of an incident region to members of a particular video communication group by pressing a dedicated PTV button implemented at the electronic computing device 110. In accordance with some embodiments, when the public safety personnel press the PTV button, the electronic computing device 110 begins to capture a field-of-view of a camera coupled to the electronic computing device 110 and then performs an assignment of video streams to watcher devices 120 in accordance with the embodiments described herein. In some embodiments, the electronic computing device 110 sends instructions regarding the assignment to one or more external cameras (e.g., drone cameras, vehicle cameras, video surveillance cameras, etc.,) deployed in the incident area, and in response, the one or more external cameras capture video stream of the sub-regions to the respective watcher devices 120 to which the sub-regions are assigned in accordance with the assignment instructions received from the electronic computing device 110.

The communication network 130 is an electronic communications network including wired and wireless connections. The communication network 130 may be implemented using a combination of one or more networks including, but not limited to, a wide area network, for example, the internet; a local area network, for example, a Wi-Fi network, or a near-field network, for example, a Bluetooth™ network. Other types of networks, for example, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof may also be used.

Figure 2:
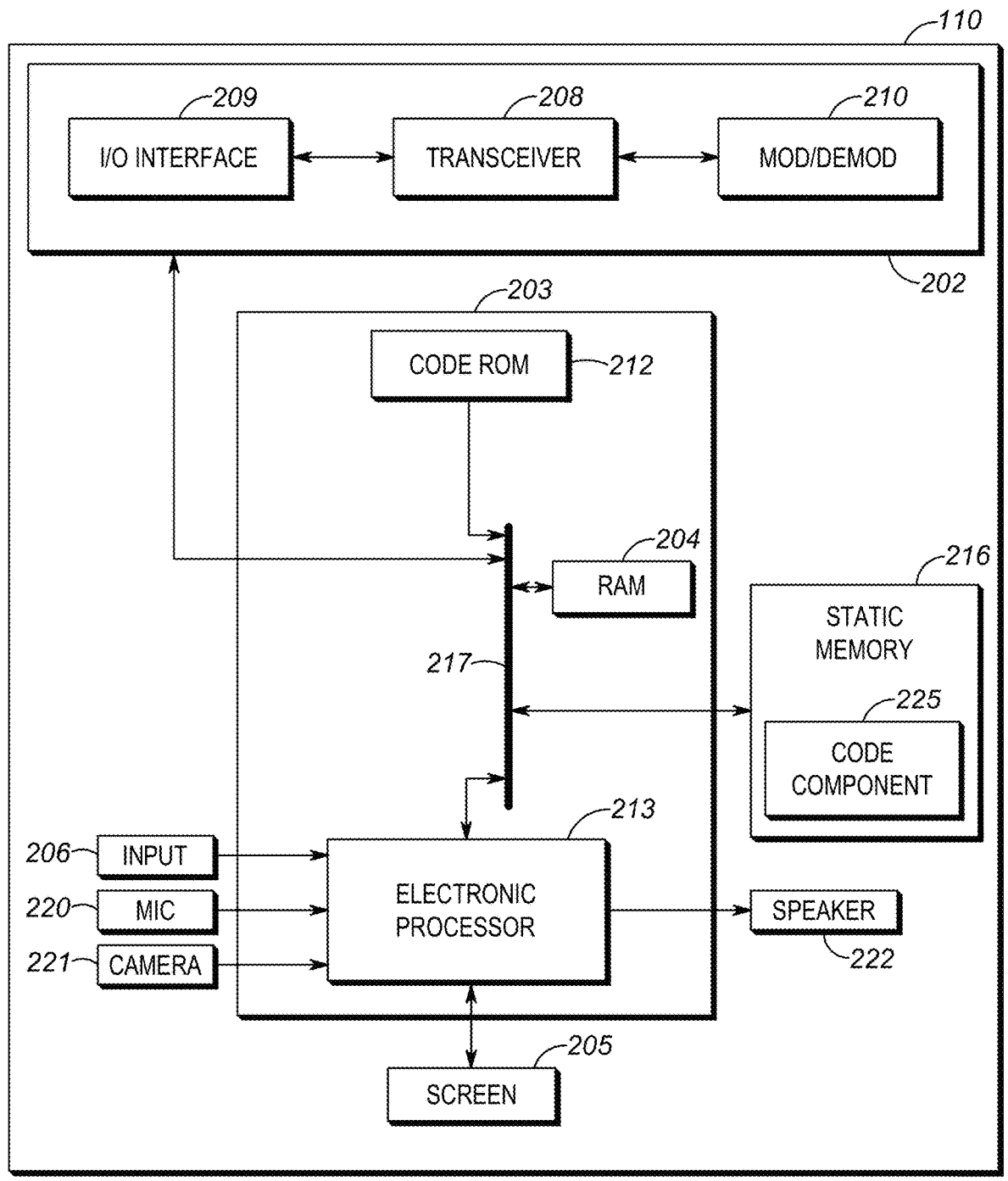
FIG. 2 is a block diagram of an electronic computing device shown in FIG. 1 in accordance with some embodiments.

FIG. 2 is an example functional block diagram of an electronic computing device operating within the communication system 100 in accordance with some embodiments. The electronic computing device performs the functions of the electronic computing device 110 shown in FIG. 1, and may be embodied in one or more communication devices or computing devices not illustrated in FIG. 1, and/or may be a distributed computing device across two or more of the foregoing (or multiple of a same type of one of the foregoing) and linked via a wired and/or wireless communication link(s). While FIG. 2 represents an electronic computing device 110 described above with respect to FIG. 1, depending on the type of electronic computing device 110, the electronic computing device 110 may include fewer or additional components in configurations different from that illustrated in FIG. 2. For example, in some embodiments, the electronic computing device 110 acting as an infrastructure controller may not include one or more of the screen 205, microphone 220, camera 221 (which may be an external camera coupled to the infrastructure controller), and speaker 222. As another example, in some embodiments, the electronic computing device 110 may be a communication device (e.g., used by public safety personnel assigned to monitor an incident scene) that includes one or more of the screen 205, microphone 220, camera 221, and speaker 222. Other combinations are possible as well.

As shown in FIG. 2, the electronic computing device 110 includes a communications unit 202 coupled to a common data and address bus 217 of a processing unit 203. The electronic computing device 110 may also include one or more input devices 206, for example, keypad, pointing device, touch-sensitive surface, button, and the like. In one embodiment, the input device 206 may include a hard or soft PTV button or interface which when selected by the user causes the electronic computing device 110 to automatically assign video streams corresponding to an incident region to watcher devices 120 associated with a video group and further establish a PTV session with watcher devices 120 to transmit respectively assigned video streams to the watcher devices 120 associated with the video group. The electronic computing device 110 also includes a microphone 220, a camera 221, and an electronic display screen 205 (which, in some embodiments, may be a touch screen and thus also acts as an input device), each coupled to be in communication with the processing unit 203.

The camera 221 captures video corresponding to its field-of-view for further processing by the processing unit 203 and/or for further transmission as a video stream by the communications unit 202 to the watcher devices 120. A speaker 222 may be present for reproducing audio that is decoded from voice or audio streams of calls received via the communications unit 202 from other devices, from digital audio stored at the electronic computing device 110, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate, for example, with watcher devices 120 in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The one or more electronic processors 213 has ports for coupling to the display screen 205, the microphone 220, the camera 221, the user input interface device 206, and/or the speaker 222. Static memory 216 may store operating code 225 for the electronic processor 213 that, when executed, performs one or more of the blocks set forth in FIG. 3 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. In accordance with some embodiments, the static memory 216 may have access to or otherwise temporarily or permanently store information included in the incident database 140. For example, the electronic computing device 110 may be configured to store incident context information associated with a particular CAD identifier assigned to the electronic computing device 110 at the static memory 216. The static memory 216 may also obtain and store video display characteristics associated with a plurality of watcher devices 120, for example, watcher devices 120 that are specifically associated with public safety personnel assigned to a particular CAD identifier corresponding to which video streams associated with an incident region are to be screened.

In accordance with some embodiments, the display screen 205 implemented at the electronic computing device 110 is configured to display a view of an image or images that are captured corresponding to a field-of-view of an incident region when the process (e.g., process 300 described with reference to FIG. 3) for assigning video streams to watcher devices 120 is invoked. The display screen 205 is also configured to visually indicate the multiple sub-regions of the incident region captured corresponding to the field-of-view of the camera, where the sub-regions are determined by the electronic processor 213 based on the positions of the detected objects of interest. The display screen 205 may also highlight one or more objects of interest enclosed within each of the sub-region and further visually identify the watcher devices 120 to which video streams corresponding to each of the sub-regions are assigned. In accordance with embodiments, the display screen 205 may also provide visual indication of watcher status corresponding to each of the sub-regions. For example, the electronic computing device 110 may receive feedback indicating whether the watcher is actively watching/screening (e.g., detected based on eye-gaze of the watcher) the video stream captured corresponding to a particular sub-region assigned to the watcher. If the feedback received by the electronic computing device 110 indicates that the watcher is not actively watching/screening (i.e., inactive status), then the display screen 205 may provide an indication of an inactive status on a sub-region assigned to the watcher. The public safety personnel operating the electronic computing device 110 may then command the electronic computing device 110 to reassign the sub-region with an inactive watcher status to another available watcher in accordance with the embodiments described herein.

Figure 3:
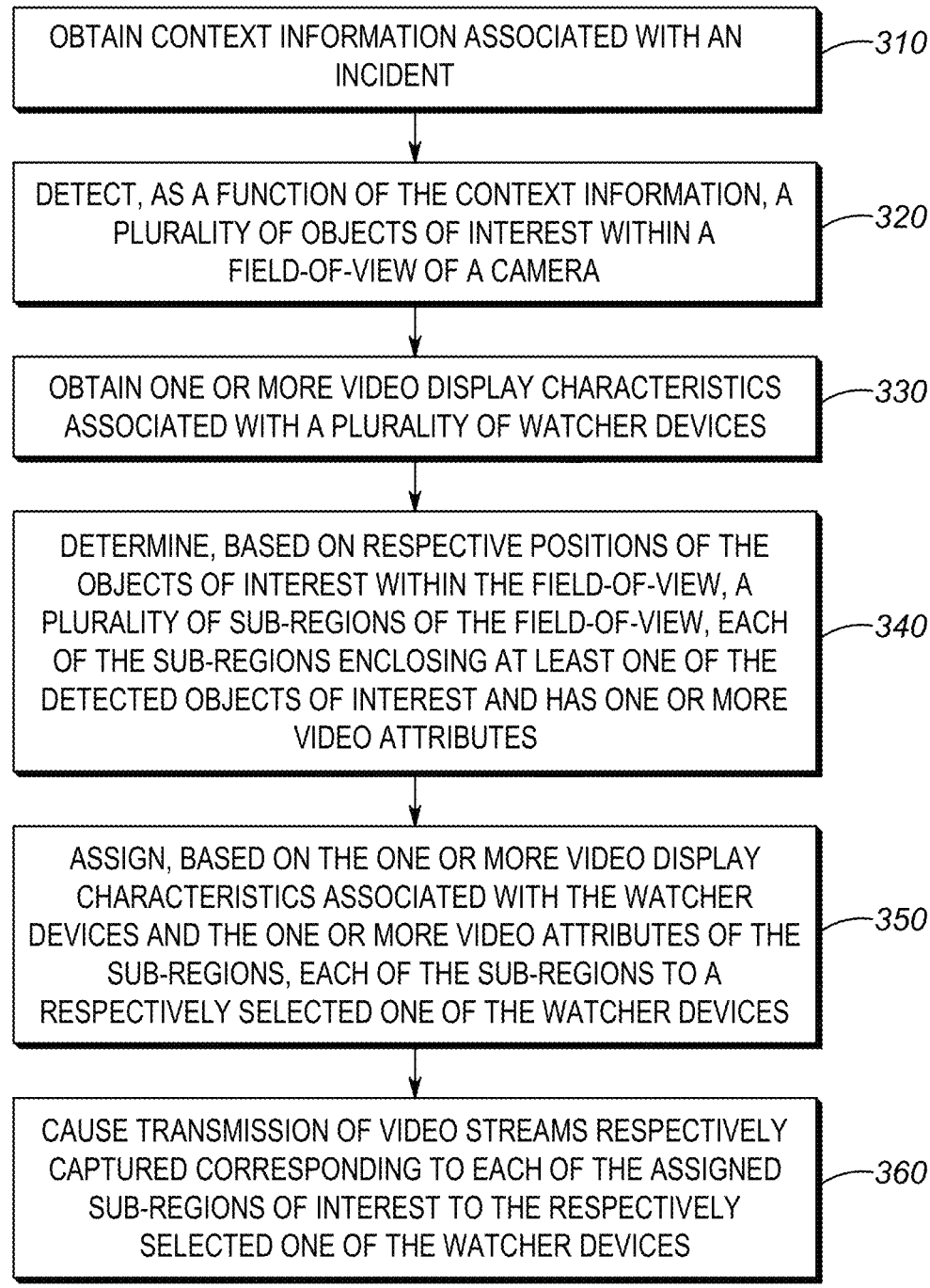
FIG. 3 illustrates a flowchart of a method of operating an electronic computing device to assign video streams to watcher devices in accordance with some embodiments.

Turning now to FIG. 3, a flowchart diagram illustrates a process 300 for operating an electronic computing device 110 to assign video streams to watcher devices 120 in accordance with some embodiments. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or electronic computing device 110 shown in FIG. 2, and embodied as a singular computing device or distributed computing device may execute process 300 via an electronic processor 224 implemented at the electronic computing device 110. The electronic computing device 110 may execute the process 300 at power-on, at some predetermined periodic time period thereafter, in response to a trigger raised locally at the device via an internal process or via an input interface (e.g., the user invoking the process 300 by pointing a camera at an incident region and/or by initiating a PTV session, for example, by pressing a PTV button implemented at the electronic computing device 110), or in response to a trigger from an accessory or an authorized external device to which the electronic computing device 110 is communicably coupled, among other possibilities.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well.

Process begins at block 310 where the electronic computing device 110 obtains context information associated with an incident. As previously described, the electronic computing device 110 may obtain context information associated with an incident in response to a trigger that is raised locally at the electronic computing device 110 or in response to a trigger received from an accessory or an external device (e.g., from remote speaker microphone operated by the public safety commander). For example, when a public safety commander operating the electronic computing device 110 points a camera toward a real world space, the electronic computing device 110 automatically (or based on input from the commander) extracts CAD ID of an incident assigned to the public safety commander and further obtains context information associated with the CAD ID of the incident, for example, from the incident database 140. The context information may include metadata identifying information related to objects of interest (e.g., determined based on historical incidents) that need to be monitored in relation to a current incident assigned to the public safety commander. The metadata may include characteristics such as facial feature of a person, a hair color, a skin tone, a tattoo, a birthmark, an eye color, a body shape, a feature of an article worn by a person (color or pattern of jewelry, watch, clothes, backpack, shoe etc., worn by a person), a feature of an inanimate object such as object type (e.g., bag make, type), shape, color, pattern. In one embodiment, the metadata may also include information about certain sub-regions or sub-areas (e.g., parking area, VIP entrance, pre-defined seat numbers or sections etc.,) of a large incident area that is required to be monitored for public safety reasons. These sub-regions or areas may correspond to areas where the probability of occurrence of abnormal or suspicious activities is very high.

Next, at block 320, the electronic computing device 110 detects, as a function of the context information obtained at block 310, a plurality of objects of interest within a field-of-view of a camera. The camera may be internally implemented at the electronic computing device 110 or alternatively the camera may be an external device that is communicatively coupled to the electronic computing device 110. In any case, when the camera is activated to capture a field-of-view of a real world space and further when the process 300 is invoked based on a local or external trigger, the electronic computing device 110 scans an image or images captured corresponding to a field-of-view of the camera using the context information to detect one or more instances of objects of interests that are identified in the incident context information obtained at block 310. In accordance with some embodiments, the electronic computing device 110 may use object classifiers corresponding to each object of interest identified in the incident context information to determine if there is an instance of an object of interest in the image that is captured corresponding to the camera's field of view.

If the electronic computing device 110 does not detect any object of interest within the field-of-view of the camera, the electronic computing device 110 may adjust the camera field-of-view automatically or by requesting the user to move the camera to cover a new space within the incident region and further scan an image captured corresponding to the adjusted field-of-view covering the new space for the purpose of detecting one or more objects of interest as identified in the incident context information. The electronic computing device 110 may repeat this process to scan the entire incident region to detect multiple objects of interest as a function of the incident context information. In one embodiment, if the electronic computing device 110 does not detect any objects of interest or otherwise detects only one object of interest as a function of the incident information, the electronic computing device 110 may proceed to skip the execution of the process blocks 330 through 360, and instead may proceed to assign a single video stream covering the larger incident area to a single selected watcher device 120. On the other hand, if the electronic computing device 110 detects a plurality of objects of interest within the field-of-view of the camera as a function of the incident context information, the electronic computing device 110 assigns video streams captured from the incident region to multiple watcher devices 120 as described herein with reference to the process blocks 330 through 360.

Next, at block 330, when the electronic computing device 110 detects multiple objects of interest within the field-of-view of the camera, the electronic computing device 110 obtains one or more video display characteristics associated with a plurality of watcher devices 120. In accordance with some embodiments, the electronic computing device 110 identifies a plurality of watcher devices 120 using user or device profiles of public safety personnel assigned to the incident. For example, the user profiles of public safety personnel assigned to the incident may indicate that a subset of public safety personnel are available (e.g., not assigned to other incident-related tasks) to be assigned to the role of watchers. Accordingly, in these embodiments, the electronic computing device 110 may select the plurality of watcher devices 120 based on the availability of the watchers. Further, the electronic computing device 110 may extract the video display characteristics of the plurality of watcher devices 120 from the device profiles (e.g., stored in the incident database 140) associated with the public safety personnel who are available to be assigned to the role of watchers. The video display characteristics of the watcher devices 120 include, but not limited to, size, shape, orientation, aspect ratio, resolution, rotatability, expandability, or foldability of an electronic display respectively associated with the watcher devices 120.

At block 340, the electronic computing device 110 determines, based on respective positions of the objects of interest with the field-of-view of the camera, a plurality of sub-regions of the field-of-view, where each of the sub-regions encloses at least one of the detected objects of interest and has one or more video attributes. In one embodiment, the electronic computing device 110 first determines the number of sub-regions to be formed from within the field-of-view based on the number of objects of interest that are detected from within the field-of-view at block 320 and a watch policy defined by a public safety agency responding to the incident. For example, if the watch policy dictates that a watcher can be assigned to screen/watch a video stream with a maximum of one (1) object of interest and further there are five (5) objects of interest that are detected from within the field-of-view corresponding to an incident region, then the electronic computing device 110 may form a maximum of five (5) sub-regions from within the field-of-view. As another example, if the watch policy dictates that a watcher can be assigned to screen a video stream with a maximum of two (2) objects of interest and there are five (5) objects of interest that are detected from within the field-of-view corresponding to an incident region, the electronic computing device 110 may form a maximum of three (3) sub-regions from within the field-of-view. In this case, for example, each of first and second sub-regions will include two objects of interest and a third sub-region region will include only one object of interest in accordance with the watch policy. In another embodiment, the electronic computing device 110 may determine the number of sub-regions to be formed from the field-of-view based on the number of available watcher devices 120 and/or watchers. For example, if there are eight (8) objects of interest that are detected at block 320 and there are only four (4) watchers that are available for watching, then the electronic computing device 110 may form four (4) sub-regions, such that, each sub-region can include a maximum of two (2) objects of interest and to ensure that each watcher can be assigned to watch a video stream with a maximum of two (2) objects of interest. Once the number of sub-regions to be formed from within the field-of-view of the camera are determined, the electronic computing device 110 determines a boundary for each of the sub-regions to ensure that each sub-region can enclose a specified number of objects of interest, i.e., at least one object of interest and to further ensure that the areas covering all of the objects of interest within the field-of-view is covered by the formed sub-regions. In accordance with some embodiments, the boundary of each of the sub-regions (i.e., shape and size of the sub-regions) may also be determined based on the video display characteristics (e.g., a size, shape, orientation, aspect ratio, resolution, rotatability, expandability, or foldability etc.,) of the electronic display associated with the available watcher devices 120. For example, an available watcher device 120 may have a circular display, in this case, the electronic computing device 110 may form a sub-region with a circular boundary enclosing one or more objects of interest to be watched. In accordance with some embodiments, the objects of interest that are relatively close to each other within the field-of-view may be enclosed within the same sub-region if the watch policy of the agency allows more than one object of interest to be watched by the same watcher. Otherwise, a separate sub-region is formed to enclose each of the objects of interest.

In any case, after the electronic computing device 110 determines the plurality of sub-regions of the field-of-view at 340, the electronic computing device 110 proceeds to block 350 to assign, based on the one or more video display characteristics associated with the plurality of watcher devices 120 and the one or more attributes of the sub-regions, each of the sub-regions to a respectively selected one of the watcher devices 120. In accordance with some embodiments, the electronic computing device 110 performs the assignment by correlating video attributes of each of the sub-regions to video display characteristics of each of the available watcher devices 120. The electronic computing device 110 then assigns a particular sub-region to a respectively selected watcher device 120 (i.e., a watcher device 120 selected from the available watcher devices 120) when there exists a correlation (i.e., when a correlation score is greater than a predetermined correlation threshold) between the video attributes of the particular sub-region and video display characteristics associated with the selected watcher device 120. In case, there is no correlation (e.g., when a correlation score is not greater than a correlation threshold) between the video attributes of a particular sub-region and video display characteristics associated with a particular watcher device 120, then the electronic computing device 110 refrains from assigning that particular sub-region to that particular watcher device 120 and instead performs correlation of the particular sub-region with other available watcher device 120 to determine if there is a better correlation with the video display characteristics of another available watcher device 120.

In accordance with some embodiments, an assignment of a sub-region to a watcher device 120 is determined based on whether a correlation score for a given combination of particular sub-region and a respectively selected watcher device 120 is greater than a correlation score that is similarly determined for the combination of particular sub-region with one or more other available watcher devices 120. For example, assume that a particular sub-region within the field-of-view is associated with one or more video attributes (e.g., the particular sub-region includes multiple objects of interest and has an area larger than other sub-regions) requiring a larger display. In this case, a watcher device 120 with a larger electronic display will have a greater correlation score than a watcher device 120 with a smaller electronic display. As another example, assume that a particular sub-region with a field-of-view is associated with one or more video attributes (e.g., the particular sub-region has a wide rectangular shape with a width to height ratio of 2:1) requiring an electronic display adapted for landscape mode. In this case, a watcher device 120 with an electronic display adapted to operate in landscape mode with an aspect ratio of 2:1 will have a greater correlation score than a watcher device 120 with an electronic display adapted to operate in portrait mode with an aspect ratio of 2:1.

The electronic computing device 110 may also correlate factors (i.e., in addition to video display characteristics) such as an operating mode, cognitive load, and network bandwidth associated with the watcher device 120 to determine if a particularly selected watcher device 120 is suitable for displaying a particular sub-region of an incident region for screening by a watcher. Additionally, or alternatively, the electronic computing device 110 may also correlate factors such as a count of objects of interest included in a particular sub-region, a watch priority of the objects of interest, and size of display of the watcher device 120 to determine if a particularly selected watcher device 120 is suitable for displaying a particular sub-region of an incident region for screening by a watcher.

In accordance with some embodiments, the electronic computing device 110, prior to assigning a particular sub-region of the field-of-view to a respectively selected watcher device 120, further determines whether the selected watcher device 120 is operating with a covert mode status. As used herein, the term "covert mode" represents an operating mode in which the electronic display of the watcher device 120 is switched off or otherwise operates in dim mode (i.e., with reduced screen brightness) to allow the public safety officer to perform a covert operation. Since the covert mode may prevent the electronic display of the watcher device 120 from displaying an assigned video stream, the electronic computing device 110 assigns the particular sub-region to a respectively selected watcher device 120 only when the respectively selected watcher device 120 is not operating in covert mode. In other words, the electronic computing device 110 refrains from assigning the particular sub-region to a watcher device 120 that is operating in covert mode and instead attempts to assign the particular sub-region to another available watcher device 120 that is not operating in covert mode as long as there exists a correlation between video attributes of the particular sub-region and video display characteristics of the another available watcher device 120.

In accordance with some embodiments, even if there exists a correlation between the video attributes of a particular sub-region to video display characteristics of a respectively selected watcher device 120, the electronic computing device 110, prior to assigning the particular sub-region to the respectively selected watcher device 120, determines whether the selected watcher device 120 is associated with a cognitive load greater than a cognitive load threshold. As used herein, the term "cognitive load" represents a cognitive load of a watcher associated with the watcher device 120. The cognitive load of a watcher may be directly proportional to the amount of information that is being presented to the watcher via a watcher device 120 and/or the tasks currently being executed by the watcher. For example, the electronic computing device 110 may determine that the cognitive load of a watcher may be greater than the cognitive threshold if information obtained from the watcher device 120 indicates one or more of: (i) watcher device 120 is already presenting another video stream to the watcher, (ii) watcher is on another call, (iii) watcher is performing one or more other tasks, for example, interviewing a witness, interrogating a suspect, responding to another incident, and (iv) watcher has an abnormal heart rate (e.g., when the officer is running). Other factors may exist as well. Since cognitive overloading prevents a watcher from effectively screening a video stream, the electronic computing device 110 assigns the particular sub-region to a respectively selected watcher device 120 when the respectively selected watcher device 120 is associated with a cognitive load that is not greater than a cognitive load threshold. In other words, the electronic computing device 110 refrains from assigning the particular sub-region to a watcher device 120 that is associated with a cognitive load greater than the cognitive load threshold and instead assigns the particular sub-region to another available watcher device 120 that is associated with a cognitive load not greater than the cognitive load threshold and further there exists a correlation between video attributes of the particular sub-region and video display characteristics of the another available watcher device 120.

In accordance with some embodiments, the electronic computing device 110 assigns a watch priority to each of the objects of interest detected at block 320. As used herein, the term "watch priority" indicates the priority with which each object of interest needs to be monitored. In other words, a sub-region enclosing an object of interest with high watch priority is assigned to a watcher device 120 associated with a relatively higher network bandwidth. As an example, the electronic computing device 110 determines that a first object of interest (e.g., a crowd at a particular section of a stadium) from the detected objects of interest has a watch priority higher than a watch priority of a second object of interest (e.g., a lone person with a blue cap) from the detected objects of interest. In this example, assume that the electronic computing device 110 further determines that a first selected one of the available watcher device 120 (e.g., watcher device 120-1) is operating with a first network bandwidth (e.g., 5 Mbps) and a second selected one of the available watcher devices 120 (e.g., watcher device 120-2) is operating with a second network bandwidth (e.g., 1 Mbps). Also assume that both first and second selected one of the watcher devices 120 have a correlation score (i.e., correlation between video display characteristics and video attributes) that is greater than a correlation threshold for a first sub-region of the sub-regions enclosing the first object of interest and a second sub-region of the sub-regions enclosing the second object of interest. In this example, the electronic computing device 110 assigns the first one of the sub-regions enclosing the first object of interest to the first selected one of the watcher devices 120 and assigns the second one of the sub-regions enclosing the second object of interest to the second selected one of the watcher devices 120 because the first selected one of the watcher device 120 is operating with the first network bandwidth that is greater than the second network bandwidth and further because the first object of interest has a watch priority higher than the second object of interest. Alternatively, the electronic computing device 110 may assign the first one of the sub-regions enclosing the first object of interest with the higher watch priority to the second selected one of the watcher devices 120 and second one of the sub-regions enclosing the second object of interest with the lower watch priority to the first selected one of the watcher devices 120 in case the second network bandwidth is greater than the first network bandwidth. In other words, in these embodiments, the electronic computing device 110 assigns a sub-region enclosing an object of interest with high watch priority to a watcher device 120 with better network bandwidth because a watcher device 120 with a relatively higher network bandwidth is capable of displaying a video stream with a relatively better quality (e.g., high resolution, reduced packet loss, etc.,) for the watcher.

In accordance with some embodiments, the electronic computing device 110 assigns a sub-region enclosing an object of interest with a high priority to a watcher device 120 with a larger display area. For example, assume that a first object of interest from the detected objects of interest has a watch priority that is higher than a watch priority of a second object of interest from the detected object of interest. Further assume that a first selected one of the watcher devices 120 (e.g., watcher device 120-1) is included with a first display area and a second selected one of the watcher devices 120 (e.g., watcher device 120-2) is included with a second display area. In this example, when the first display area is larger than the second display area, the electronic computing device 110 assigns a first one of the sub-regions enclosing the first object of interest with the higher watch priority to the first selected one of the watcher devices 120 and a second one of the sub-regions enclosing the second object of interest with the lower watch priority to the second selected one of the watcher devices 120. Alternatively, when the second display area is larger than the first display area, the electronic computing device 110 assigns the first one of the sub-regions enclosing the first object of interest with the higher watch priority to the second selected one of the watcher devices 120 and assigning the second one of the sub-regions enclosing the second object of interest with the lower watch priority to the first selected one of the watcher devices 120.

In accordance with some embodiments, the electronic computing device 110 assigns a sub-region to a particular watcher region based on the count of objects of interest included in the sub-region. In these embodiments, the electronic computing device 110 determines a count of objects of interest enclosed in each of the sub-regions.

As an example, assume that a count of the objects of interest enclosed in a first one of the sub-regions is greater than a count of the objects of interest enclosed in a second one of the sub-regions. Further, assume that the electronic computing device 110 has determined that a first selected one of the watcher devices 120 (e.g., watcher device 120-1) is operating with a first network bandwidth and a second selected one of the watcher devices 120 (e.g., watcher device 120-2) is operating with a second network bandwidth. In this example, when the first network bandwidth is greater than the second network bandwidth, the electronic computing device 110 assigns the first one of the sub-regions to the first selected one of the watcher devices 120 and assigning the second one of the sub-regions to the second selected one of the watcher devices 120. Alternatively, when the second network bandwidth is greater than the first network bandwidth, the electronic computing device 110 assigns the first one of the sub-regions to the second selected one of the watcher devices 120 and the second one of the sub-regions to the first selected one of the watcher devices 120. In other words, in these embodiments, the electronic computing device 110 ensures that a sub-region with a large number of objects of interest is assigned to a watcher device 120 with a network bandwidth that is suitable for downloading and displaying a video stream covering a large number of objects of interest.

As another example, assume that a count of the objects of interest enclosed in a first one of the sub-regions is greater than a count of the objects of interest enclosed in a second one of the sub-regions. Further assume that the electronic computing device 110 has determined that a first selected one of the watcher devices 120 (e.g., watcher device 120-1) is included with a first display area and a second selected one of the watcher devices 120 (e.g., watcher device 120-2) is included with a second display area. In this example, when the first display area is larger than the second display area, the electronic computing device 110 assigns the first one of the sub-regions to the first selected one of the watcher devices 120 and the second one of the sub-regions to the second selected one of the watcher devices 120. Alternatively, when the second display area is larger than the first display area, the electronic computing device 110 assigns the first one of the sub-regions to the second selected one of the watcher devices 120 and assigning the second one of the sub-regions to the first selected one of the watcher devices 120. In other words, in these embodiments, the electronic computing device 110 ensures that a sub-region with a large number of objects of interest is assigned to a watcher device 120 with a larger display area that is suitable for displaying a video stream covering a large number of objects of interest.

As a further example, assume that a count of the objects of interest enclosed in a first one of the sub-regions is greater than a count of the objects of interest enclosed in a second one of the sub-regions. Further assume that the electronic computing device 110 has determined that a first selected one of the watcher devices 120 (e.g., watcher device 120-1) is associated with a first cognitive load and a second selected one of the watcher devices 120 (e.g., watcher device 120-2) is associated with a second cognitive load. In this example, when the first cognitive load is lower than the second cognitive load, the electronic computing device 110 assigns the first one of the sub-regions to the first selected one of the watcher devices 120 and the second one of the sub-regions to the second selected one of the watcher devices 120. Alternatively, when the second cognitive load is lower than the first cognitive load, the electronic computing device 110 assigns the first one of the sub-regions to the second selected one of the watcher devices 120 and the second one of the sub-regions to the first selected one of the watcher devices 120. In other words, in this embodiments, the electronic computing device 110 ensures that a sub-region with a large number of objects of interest is assigned to a watcher device 120 with a lower cognitive load to ensure that the cognitive load of the watcher is not high enough to prevent the watcher from effectively screening/watching a video stream of a sub-region with a large number of objects of interest.

In accordance with some embodiments, the electronic computing device 110 applies a combination of factors including video display characteristics (including a size, shape, orientation, aspect ratio, resolution, rotatability, expandability, or foldability of an electronic display associated with a watcher device 120), operating mode (covert mode status), network bandwidth, and cognitive load associated with the watcher devices 120 as well as the unique video attributes (e.g., size, shape, count of objects of interest, watch priority of objects of interest, etc.,) of the sub-regions identified within the field-of-view corresponding to an incident region, to assign each of the sub-regions to a respectively selected one of the watcher devices 120. In one embodiment, the electronic computing device may rank the watcher devices 120 based on the combination of factors such as a display size and available network bandwidth. Assume that network bandwidth is specified in pixels/second and display size is determined by total pixels per frame. In this case, the watcher devices 120 may be ranked by responsiveness (i.e., time taken to receive one single frame) of the watcher devices i.e., no. of pixels per frame divided by network bandwidth. As an example, if a video stream includes two-thousand (2000) pixels per frame and network bandwidth of a first watcher device 120-1 is one-thousand (1000) pixels/second, then it will take two seconds to transmit one frame to a first watcher device. On the other hand, it may take only one second to transmit one frame to a second watcher device 120-2 with two-thousand (2000) pixels/second network bandwidth. In this case, the electronic computing device 110 may assign a higher ranking to the second watcher device 120-2 than the first watcher device 120-1. Accordingly, in this example, the electronic computing device 110 may assign a sub-region with one or more objects of interest with high priority watch status or a sub-region with large number of objects of interest to the second watcher device 120-2 which has higher ranking than the first watcher device 120-1.

Next, at block 360, the electronic computing device 110 causes the transmission of video streams respectively captured corresponding to each of the assigned sub-regions of interest to the respectively selected one of the watcher devices 120. In one embodiment, the electronic computing device 110 directly captures, via a camera locally implemented at the electronic computing device 110, video streams corresponding each of the sub-regions within its field-of-view and further transmits, via the transceiver 208 over the communication network 130, the video streams to the respective watcher devices 120 to which the sub-regions were assigned at block 350. In this embodiment, the electronic computing device 110 may establish a PTV session to simultaneously transmit the video streams to all watcher devices 120 associated with a video communication group.

The video stream also includes metadata identifying information (e.g., pixel positions or coordinates of boundary of the sub regions) related to the sub-regions along with an indication identifying, for each watcher device 120 in the group, a sub-region that is assigned to the group. When a watcher device 120 in the group receives the video stream, the watcher device 120 extracts information related to the sub-region to which the watcher device 120 and selectively displays, via an associated electronic display, only the video stream portion (e.g., corresponding to pixel positions and boundary) corresponding to the sub-region to which the watcher device 120 is assigned. As an example, the watcher device 120 may zoom-in or crop the video stream portion corresponding to the assigned sub-region, such that, the electronic display associated with the watcher device only displays the zoomed-in or cropped video stream portion corresponding to that sub-region assigned to the watcher for separate screening.

In accordance with embodiments, the watcher device 120 receives a live video stream corresponding to the sub-region assigned to it. The video stream corresponding to the assigned sub-region is continued to be transmitted to the watcher device 120 unless the electronic computing device 110 receives an indication to stop transmitting the video stream. The indication to stop transmitting the video stream corresponding to a particular sub-region may be generated when the objects of interest detected in the particular sub-region are not required to be watched any longer or when the object of interest has moved out of the particular sub-region sub-regions. In one embodiment, when the objects of interest enclosed in a particular sub-region have moved out of the sub-region, the electronic computing device 110 may decide to determine a new set of sub-regions either within the same field-of-view of the camera or by adjusting the field-of-view of the camera to align with the new position of the objects of interest previously detected at block 320. The electronic computing device 110 may then repeat the functions described at blocks 350 and 360 for the new set of sub-regions in order to assign the new set of sub-regions to respectively selected watcher devices and further cause transmission of video streams corresponding to the new-set of sub-regions to the selected watcher devices 120. The determination of new set of sub-regions and the transmission of video streams corresponding to the new set of sub-regions ensures that the objects of interest previously detected at block 320 are continued to be watched by the watcher devices 120 even after the objects of interest move out of the previously determined sub-regions.

In one embodiment, the electronic computing device 110 transmits an instruction requesting an external camera (e.g., drone camera, vehicle cameras, surveillance cameras, etc.) deployed in the incident area to transmit video streams to multiple watcher devices 120. The instruction includes information identifying the field-of-view of the camera, sub-regions determined from within the field-of-view, and identifier of watcher devices 120 to which each of the sub-regions are assigned. In response to the instruction, the external camera captures and streams the sub-regions to the respective watcher devices 120 to which the sub-regions are assigned in accordance with the assignment instructions received from the electronic computing device 110. In another embodiment, the electronic computing device 110 may transmit an instruction to multiple external cameras. As an example, the electronic computing device 110 may transmit an instruction to a drone camera requesting the drone camera to move to the incident region and further capture and transmit a video stream corresponding to a first one of the sub-regions of the field-of-view to a first watcher device 120 (e.g., watcher device 120-1) to which the first one of the sub-regions is assigned. In this example, the instruction to the drone camera may include information identifying the field-of-view of the camera and more specifically information identifying the first one of the sub-regions, and the identifier of the first watcher device 120 to which the first one of the sub-region is assigned. Similarly, in this example, the electronic computing device 110 may transmit an instruction to a surveillance camera (e.g., a surveillance camera already having a field-of-view overlapping the field-of-view of the camera associated with the electronic computing device 110) to capture and transmit a video stream corresponding to a second one of the sub-regions of the field-of-view to a second watcher device 120 (e.g., watcher device 120-2) to which the second one of the sub-regions is assigned. The instruction to the surveillance camera may include information identifying the field-of-view of the camera and more specifically information identifying the second one of the sub-regions, and the identifier of the second watcher device 120 to which the second one of the sub-region is assigned. In this manner, the electronic computing device 110 may employ multiple external cameras to transmit video streams corresponding to multiple sub-regions to assigned watcher devices 120.

In accordance with some embodiments, the electronic computing device 110, after causing the transmission of video streams to assigned watcher devices 120 at block 360, monitors watcher status corresponding the video streams respectively transmitted to each of the selected one of the watcher devices 120. As an example, the electronic computing device 110 periodically receives, from the respective watcher devices 120, information indicating whether the watchers are actively watching/screening the video stream captured corresponding to a particular sub-region assigned to the watcher device 120. If the feedback received by the electronic computing device 110 indicates that a first one of the watcher devices 120 (e.g., watcher device 120-1) is not actively watching/screening (i.e., inactive status), the electronic computing device 110 may re-assign the sub-region with an inactive watcher status to a second one of the watcher devices 120 (e.g., watcher device 120-2) based on process block 350. In this case, after re-assigning the sub-region to the second one of the watcher devices 120, the electronic computing device 110 causes transmission of the video stream to the second one of the watcher devices 120 to which the sub-region is re-assigned as described in process block 360. In one embodiment, the second one of the watcher devices 120 to which the sub-region is re-assigned may be already receiving and displaying video stream corresponding to another one of the sub-regions to which the second one of the watcher devices 120 is assigned. In this case, the second one of the watcher devices 120 may be configured to receive and display video stream corresponding to both the previously assigned sub-region as well as the reassigned sub-region. As an example, the second one of the watcher devices 120 may be associated with a large display area that is capable of displaying video stream corresponding to both the previously assigned sub-region as well as the reassigned sub-region. The video streams corresponding to the two sub-regions may be arranged, for example, side by side (e.g., split screen view) within the display area of the watcher device 120 to ensure that the watcher can effectively screen both the video streams.

Figure 4:
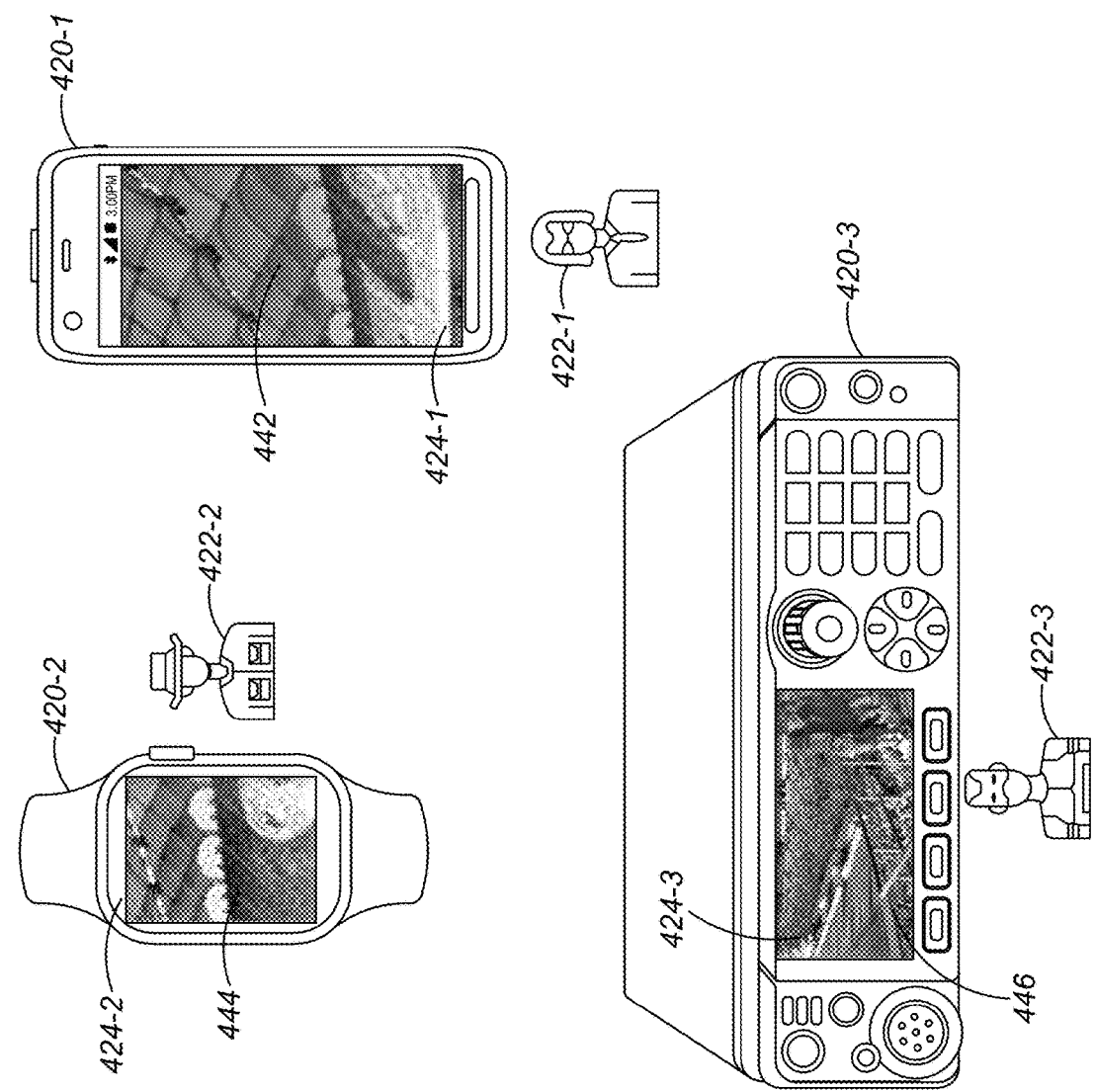
FIG. 4 illustrates an example of a graphical user interface implemented at an electronic computing device for assigning video streams to watcher devices.
Figure 4:
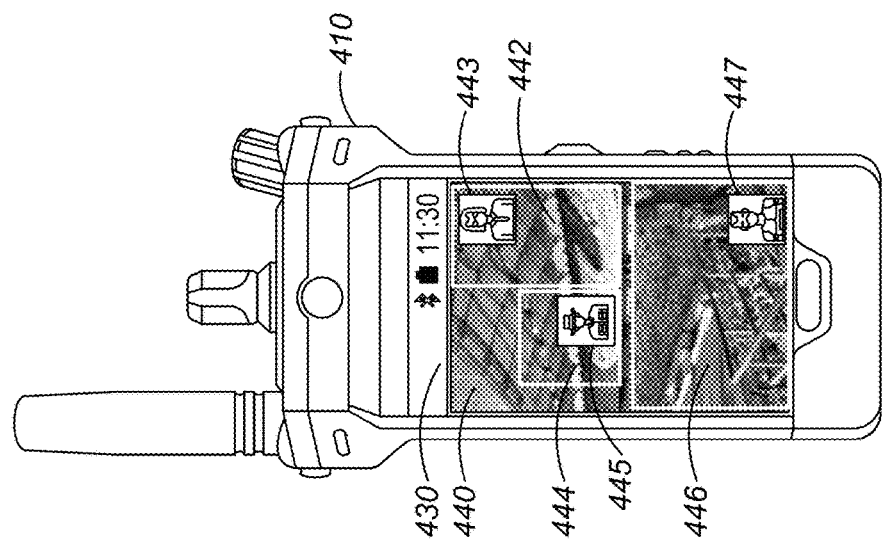

FIG. 4 illustrates an example of a graphical user interface implemented at an electronic computing device for assigning video streams to watcher devices 120. A portable radio device 410 (similar to electronic computing device 110 shown in FIGS. 1, 2) is shown in FIG. 4 as including an electronic display screen 430 with a graphical user interface 440. For example, the portable radio device 410 may be operated by a public safety commander assigned to monitor an incident at a sports stadium. As shown in FIG. 4, the graphical user interface 440 provides an image or a live video view of a region (i.e., a region to be monitored in relation to the incident assigned to the public safety commander) that is captured within a field-of-view of a camera implemented at the portable radio device 410. In accordance with the process 300 described above, the portable radio device 410 automatically divides the field-of-view (i.e., an image corresponding to the incident region) into different sub-regions 442, 444, 446 and further assigns the sub-regions 442, 444, 446 to watcher devices 420-1, 420-2, 420-3, respectively. The watcher devices 420 may be similar to the watcher devices 120 shown in FIG. 1. In one embodiment, the portable radio device 410 uses best-fit optimization algorithm to set the areas (i.e., sub-regions) to be watched by arranging/rotating the shapes representing the electronic display area of the watcher devices 420-1, 420-2, 420-3 in such a way to get maximal coverage of areas containing the objects of interest detected within the field-of-view of the device's 410 camera. Watcher devices 420 with larger displays may be prioritized to cover sub-regions with more objects of interest.

In the example shown in FIG. 4, the portable radio device 410 assigns sub-region 442 to watcher device 420-1 based on a correlation between the shape (i.e., rectangular shape with height to width ratio of 2:1) of the sub-region 442 and shape (i.e., tall rectangular shape with 2:1 aspect ratio) and orientation (i.e., portrait rotation) of the electronic display 424-1 associated with the watcher device 420-1. The portable radio device 410 assigns sub-region 444 to watcher device 420-2 based on a correlation between the size of the sub-region 44 and size of the electronic display 424-2 (i.e., size of smart watch device is relatively smaller) associated with the watcher device 420-2. The portable radio device 410 assigns sub-region 446 to watcher device 420-3 because the electronic display 424-3 associated with the watcher device 420-3 is wide and cannot be rotated. Accordingly, the sub-region 446 which has the shape of a large rectangle with a landscape orientation is assigned to the watcher device 420-3 that has a larger display area than the other watcher devices 420-1, 420-2.

The portable radio device 410 then generates a visual map at the graphical user interface to show a spatial arrangement of the sub-regions 442, 444, 446 within the field-of-view of the camera. The graphical user interface 440 provides an indication, for example, by overlaying on each sub-region, an avatar representing a respective watcher device to which the sub-region is assigned for screening. For example, as shown in FIG. 4, a first avatar 443 representing a watcher 422-1 is overlaid on sub-region 442 to indicate that the sub-region 442 is assigned to a watcher device 420-1 associated with the watcher 422-1 for screening. A second avatar 445 representing a watcher device 422-2 is overlaid on a sub-region 444 to indicate that the sub-region 444 is assigned to a watcher device 420-2 associated with the watcher 422-2. Similarly, a third avatar 447 representing a watcher device 420-3 is overlaid on a sub-region 446 to indicate that the sub-region 446 is assigned to a watcher device 420-3 associated with the watcher 422-3.

In accordance with some embodiments, when the graphical user interface showing the visual map of the formation of sub-regions and assignment of the sub-regions is output to the public safety commander via the portable radio device 410, the public safety commander has the option of modifying the boundaries of one or more of the sub-regions 442, 444, 446 as well as modifying the assignment of the sub-regions 442, 444, 446 to a different watcher device than one indicated in the visual map. For example, the public safety commander can interact (e.g., via input) with the graphical user interface to redraw the boundaries of the sub-regions, thereby resulting in the formation of a new set of sub-regions within the same field-of-view displayed on the electronic display 440. In other words, when the portable radio device 410 receives a user input adjusting the boundaries of one or more sub regions, the portable radio device 410 forms a different set of sub-regions each enclosing at least one of the object of interests previously detected within the field-of-view. When the new set of sub-regions are formed, the portable radio device 410 re-computes the assignment of the sub-regions in accordance with the process block 350 described in FIG. 3. In other words, the portable radio device 410 reassigns, based on the one or more video display characteristics associated with the watcher devices 420-1, 420-2, 420-3, each of the different sets of sub-regions to a respectively re-selected one of the watcher devices 420-1, 420-2, 420-3. The watcher devices 420-1, 420-2, 420-3 that are re-selected for the different set of sub-regions are indicated on the respective sub-regions via avatars representing the respective watchers. When the public safety commander provides a user input approving the assignment of re-selected watcher devices, the portable radio device 410 causes transmission of video streams respectively captured corresponding to each of the assigned different sets of sub-regions of interest to the respectively re-selected one of the watcher devices 420-1, 420-2, 420-3.

As shown in FIG. 4, the watcher device 420-1 associated with the watcher 422-1 has an electronic display 424-1 that displays a video stream corresponding to the sub-region 442 assigned to it by the portable radio device 410. The watcher device 420-2 associated with the watcher 422-2 has an electronic display 424-2 that displays a video stream corresponding to the sub-region 444 assigned to it by the portable radio device 410. Similarly, the watcher device 420-3 associated with the watcher 422-3 has an electronic display 426-2 that displays a video stream corresponding to the sub-region 446 assigned to it by the portable radio device 410.

In accordance with some embodiments, the portable radio device 410 monitors watcher status corresponding to each of the sub-regions 442, 444, 446 assigned to the watcher devices 420-1, 420-2, 420-3, respectively. In these embodiments, the portable radio device 410 may generate an indication to show a current watcher status corresponding to each of the sub-regions 442, 444, 446. For example, the avatars 443, 445, 447 representing the respective watchers 422-1, 422-2, 422-3 may be highlighted in a predefined color or pattern to indicate their corresponding watcher status. If the watcher status provides that the watcher 422-2 is not actively watching the video stream captured corresponding to the sub-region 444, the avatar 445 representing the watcher 422-2 may be highlighted in red color to indicate that the watcher is not actively watching the video stream. In response, the public safety commander may request the device 410 to re-assign the sub-region 444 to a different watcher device for screening. Alternatively, if the watcher status provides that the watcher 422-2 is actively watching the video stream captured corresponding to the sub-region 444, the avatar 445 representing the watcher 422-2 may be highlighted in green color to indicate that the watcher is actively watching the video stream.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of assigning video streams to watcher devices, the method comprising:
    obtaining, at an electronic computing device, context information associated with an incident;
    detecting, at the electronic computing device, as a function of the context information, a plurality of objects of interest within a field-of-view of a camera;
    obtaining, at the electronic computing device, one or more video display characteristics associated with a plurality of watcher devices;
    determining, at the electronic computing device, based on respective positions of the objects of interest within the field-of-view, a plurality of sub-regions of the field-of-view of the camera, each of the sub-regions enclosing at least one of the detected objects of interest detected within the field-of-view of the camera and has one or more video attributes;
    selecting, at the electronic computing device, respectively for each of the plurality of sub-regions of the field-of-view of the camera, a different one of the watcher devices based on a correlation between the one or more video attributes of the sub-regions and the one or more video display characteristics associated with the watcher devices;
    assigning, at the electronic computing device, each of the sub-regions of the field-of-view of the camera to a respectively selected one of the watcher devices; and
    causing, at the electronic computing device, transmission of video streams respectively captured corresponding to each of the assigned sub-regions to the respectively selected one of the watcher devices.

2. The method of claim 1, wherein the one or more video display characteristics include a size, shape, orientation, aspect ratio, resolution, rotatability, expandability, or foldability of an electronic display respectively associated with the watcher devices, the method further comprising:
    prior to assigning, determining whether the size, shape, orientation, aspect ratio, resolution, rotatability, expandability, or foldability of the electronic display associated with the watcher devices correlates with the video attributes of the sub-regions,
    wherein the assigning comprises assigning each of the sub-regions to the respectively selected one of the watcher devices when the size, shape, orientation, aspect ratio, resolution, rotatability, expandability, or foldability of the electronic display associated with the respectively selected one of the watcher devices correlates with the video attributes of the respectively assigned sub-regions.

3. The method of claim 2, further comprising:
    refraining from assigning a particular one of the sub-regions to a particular one of the watcher devices when the size, shape, orientation, aspect ratio, resolution, rotatability, expandability, or foldability of the electronic display associated with the particular one of the watcher devices does not correlate with the video attributes of the particular one of the sub-regions.

4. The method of claim 2, wherein assigning each of the sub-regions to the respectively selected one of the watcher devices further based on one or more of:
    network bandwidth associated with the watcher devices;
    covert mode status associated with the watcher devices;
    a count of objects of interest enclosed in each of the sub regions; or
    a watch priority associated with each of the objects of interest enclosed in each of the sub-regions.

5. The method of claim 1, further comprising:
    prior to assigning, determining whether each of the respectively selected one of the watcher devices is operating in a covert mode;
    wherein the assigning comprises assigning each of the sub-regions to the respectively selected one of the watcher devices when each of the respectively selected one of the watcher devices is not operating in a covert mode.

6. The method of claim 5, further comprising:
    refraining from assigning a particular one of the sub-regions to a particular one of the watcher devices when the particular one of the watcher devices is determined to be operating in a covert mode.

7. The method of claim 1, further comprising:
    prior to assigning, determining whether each of the respectively selected one of the watcher devices is associated with a cognitive load greater than a cognitive load threshold; and
    wherein assigning comprises assigning each of the sub-regions to the respectively selected one of the watcher devices when each of the respectively selected one of the watcher devices is associated with a respective cognitive load that is not greater than the cognitive load threshold.

8. The method of claim 1, further comprising:
    assigning a watch priority to each of the detected objects of interest,
    determining that a first object of interest from the detected objects of interest has a watch priority that is higher than a watch priority of a second object of interest from the detected objects of interest;
    determining that a first selected one of the watcher devices is operating with a first network bandwidth and a second selected one of the watcher devices is operating with a second network bandwidth; and
    wherein assigning comprises:
    assigning a first one of the sub-regions enclosing the first object of interest to the first selected one of the watcher devices and assigning a second one of the sub-regions enclosing the second object of interest to the second selected one of the watcher devices when the first network bandwidth is greater than the second network bandwidth; and
    assigning the first one of the sub-regions enclosing the first object of interest to the second selected one of the watcher devices and assigning the second one of the sub-regions enclosing the second object of interest to the first selected one of the watcher devices when the second network bandwidth is greater than the first network bandwidth.

9. The method of claim 1, further comprising:
assigning a watch priority to the detected objects of interest,
determining that a first object of interest from the detected objects of interest has a watch priority that is higher than a watch priority of a second object of interest from the detected objects of interest;
determining that a first selected one of the watcher devices is included with a first display area and a second selected one of the watcher devices is included with a second display area; and
wherein assigning comprises:
assigning a first one of the sub-regions enclosing the first object of interest to the first selected one of the watcher devices and assigning a second one of the sub-regions enclosing the second object of interest to the second selected one of the watcher devices when the first display area is larger than the second display area; and
assigning the first one of the sub-regions enclosing the first object of interest to the second selected one of the watcher devices and assigning the second one of the sub-regions enclosing the second object of interest to the first selected one of the watcher devices when the second display area is larger than the first display area.

10. The method of claim 1, further comprising:
determining a count of the objects of interest enclosed in each of the sub-regions;
determining that a count of the objects of interest enclosed in a first one of the sub-regions is greater than a count of the objects of interest enclosed in a second one of the sub-regions; and
determining that a first selected one of the watcher devices is operating with a first network bandwidth and a second selected one of the watcher devices is operating with a second network bandwidth; and
wherein assigning comprises:
assigning the first one of the sub-regions to the first selected one of the watcher devices and assigning the second one of the sub-regions to the second selected one of the watcher devices when the first network bandwidth is greater than the second network bandwidth; and
assigning the first one of the sub-regions to the second selected one of the watcher devices and assigning the second one of the sub-regions to the first selected one of the watcher devices when the second network bandwidth is greater than the first network bandwidth.

11. The method of claim 1, further comprising:
determining a count of the objects of interest enclosed in each of the sub-regions;
determining that a count of the objects of interest enclosed in a first one of the sub-regions is greater than a count of the objects of interest enclosed in a second one of the sub-regions; and
determining that a first selected one of the watcher devices is included with a first display area and a selected second one of the watcher devices is included with a second display area; and
wherein assigning comprises:
assigning the first one of the sub-regions to the first selected one of the watcher devices and assigning the second one of the sub-regions to the second selected one of the watcher devices when the first display area is larger than the second display area; and
assigning the first one of the sub-regions to the second selected one of the watcher devices and assigning the second one of the sub-regions to the first selected one of the watcher devices when the second display area is larger than the first display area.

12. The method of claim 1, further comprising:
determining a count of the objects of interest enclosed in each of the sub-regions;
determining that a count of the objects of interest enclosed in a first one of the sub-regions is greater than a count of the objects of interest enclosed in a second one of the sub-regions; and
determining that a first selected one of the watcher devices is associated with a first cognitive load and a second selected one of the watcher devices is associated with a second cognitive load;
wherein assigning comprises:
assigning the first one of the sub-regions to the first selected one of the watcher devices and the second one of the sub-regions to the second selected one of the watcher devices when the first cognitive load is lower than the second cognitive load; and
assigning the first one of the sub-regions to the second selected one of the watcher devices and the second one of the sub-regions to the first selected one of the watcher devices when the second cognitive load is lower than the first cognitive load.

13. The method of claim 1, further comprising:
providing, at the electronic computing device, a graphical user interface indicating the assignment of each of the sub-regions to the respectively selected one of the watcher devices, the graphical user interface further including a visual map showing a spatial arrangement of the sub-regions relative to the field-of-view of the camera.

14. The method of claim 13, further comprising:
modifying assignment of one or more of the sub-regions to a different one of the watcher devices in response to a user input received at the graphical user interface.

15. The method of claim 14, further comprising:
receiving a user input adjusting boundary of the one or more sub-regions thereby resulting in the formation of a different set of sub-regions each enclosing at least one of the detected objects of interest; and
responsively assigning, at the electronic computing device, based on the one or more video display characteristics associated with the watcher devices, each of the different set of sub-regions to a respectively re-selected one of the watcher devices; and
causing, at the electronic computing device, transmission of video streams respectively captured corresponding to each of the assigned different set of sub-regions to the respectively re-selected one of the watcher devices.

16. The method of claim 1, further comprising:
subsequent to transmitting the video streams, monitoring watcher status corresponding to the video streams respectively transmitted to each of the selected one of the watcher devices;
determining that the watcher status corresponding to a first one of the selected one of the watcher devices indicates an inactive status, and responsively re-assigning a first one of the sub-regions assigned to the first one of the selected one of the watcher devices to a second one of the selected one of the watcher devices to which a second one of the sub-regions is previously assigned; and wherein subsequent to re-assigning the first one of the sub-regions to the second one of the selected one of the watcher devices, causing transmission of video streams respectively captured corresponding to both the first one of the sub-regions and second one of the sub-regions to the second one of the selected one of the watcher devices.

17. An electronic computing device, comprising:

a transceiver; and an electronic processor communicatively coupled to the transceiver, wherein the electronic processor is configured to:

obtain context information associated with an incident;

detect, as a function of the context information, a plurality of objects of interest within a field-of-view of a camera;

obtain one or more video display characteristics associated with a plurality of watcher devices;

determine, based on respective positions of the objects of interest within the field-of-view, a plurality of sub-regions of the field-of-view of the camera, each of the sub-regions enclosing at least one of the detected objects of interest detected within the field-of-view of the camera and has one or more video attributes;

select, respectively for each of the plurality of sub-regions of the field-of-view of the camera, a different one of the watcher devices based on a correlation between the one or more video attributes of the sub-regions and the one or more video display characteristics associated with the watcher devices;

assign each of the sub-regions of the field-of-view of the camera to a respectively selected one of the watcher devices; and cause transmission of video streams respectively captured corresponding to each of the assigned sub-regions to the respectively selected one of the watcher devices.

18. The electronic computing device of claim 17, further comprising:

an electronic display screen providing a graphical user interface indicating the assignment of each of the sub-regions to the respectively selected one of the watcher devices, the graphical user interface further including a visual map showing a spatial arrangement of the sub-regions relative to the field-of-view of the camera.

19. The electronic computing device of claim 17, wherein the one or more video display characteristics include a size, shape, orientation, aspect ratio, resolution, rotatability, expandability, or foldability of an electronic display respectively associated with the watcher devices, wherein the electronic processor is configured to determine whether the size, shape, orientation, aspect ratio, or resolution of the electronic display associated with the watcher devices correlates with the video attributes of the sub-regions and assign each of the sub-regions to the respectively selected one of the watcher devices when the size, shape, orientation, aspect ratio, resolution, rotatability, expandability, or foldability of the electronic display associated with the respectively selected one of the watcher devices correlates with the video attributes of the respectively assigned sub-regions.

20. The electronic computing device of claim 19, wherein the electronic processor is configured to assign each of the sub-regions to the respectively selected one of the watcher devices further based on one or more of:

network bandwidth associated with the watcher devices;

covert mode status associated with the watcher devices;

a count of objects of interest enclosed in each of the sub regions; or a watch priority associated with each of the objects of interest enclosed in each of the sub-regions.

\* \* \* \* \*